United States Patent
Yamaji et al.

[11] Patent Number: 5,308,124
[45] Date of Patent: May 3, 1994

[54] THRUST RING FOR PIPE JOINTS

[75] Inventors: Michio Yamaji; Nobukazu Ikeda; Naoya Masuda; Tetsuya Kojima, all of Osaka, Japan

[73] Assignee: Fujikin Incorporated, Osaka, Japan

[21] Appl. No.: 865,542

[22] Filed: Apr. 9, 1992

[30] Foreign Application Priority Data

Apr. 11, 1991 [JP] Japan .................. 3-023970[U]

[51] Int. Cl.⁵ .............................. F16L 25/00
[52] U.S. Cl. .................. 285/328; 285/346; 285/353; 285/422
[58] Field of Search .......... 285/387, 388, 89, 328, 285/305, 321, 348, 422, 382.7, 340; 411/516, 517, 518, 519

[56] References Cited

U.S. PATENT DOCUMENTS

| | | | |
|---|---|---|---|
| 2,136,155 | 11/1938 | Spicelli | 411/517 |
| 2,200,500 | 5/1940 | Hinrichs | |
| 2,382,948 | 8/1945 | Brozck | 411/517 |
| 2,491,310 | 12/1949 | Heimann | 411/518 |
| 3,352,576 | 11/1967 | Thomsen | 285/321 X |
| 3,643,984 | 2/1972 | Bulleri | 285/382.7 X |

FOREIGN PATENT DOCUMENTS

| | | | |
|---|---|---|---|
| 2567243 | 10/1986 | France | |
| 2-56907 | 10/1990 | Japan | 411/516 |
| 745847 | 7/1956 | United Kingdom | |
| 755118 | 8/1956 | United Kingdom | 285/388 |

Primary Examiner—Dave W. Arola
Attorney, Agent, or Firm—Armstrong, Westerman, Hattori, McLeland & Naughton

[57] ABSTRACT

A pipe joint thrust ring to be interposed between a joint member of a pipe joint and a connecting threaded member rotatably fitted to the joint member. The thrust ring comprises a C-shaped body in the form of a circle partly cut away and having spring elasticity. The inner width between opposed ends of the C-shaped body is maller than the outside diameter of the joint member and can be increased to a value equal to the outside diameter of the joint member.

7 Claims, 2 Drawing Sheets

THRUST RING FOR PIPE JOINTS

BACKGROUND OF THE INVENTION

The present invention relates to thrust rings for pipe joints. The term the "thrust ring for pipe joints" refers to a washerlike ring which is interposed between a joint member of a pipe joint and a connecting threaded member, such as a hollow bolt or cap nut, rotatably fitted to the joint member for preventing the joint member and the threaded member from rotating together.

Pipe joints are known which comprise a pair of joint members each having an outer flange at one end, an annular gasket interposed between the flanged ends of the joint members, a hollow bolt having an externally threaded surface and a bore extending axially therethrough for inserting one of the joint members through the bolt, and a cap nut having an internally threaded surface screwed on the externally threaded surface of the hollow bolt and formed with a hole in the center of its top wall for inserting the other joint member therethrough. A thrust ring is interposed between the flange of one of the joint members and the inner end of the hollow bolt, as well as between the flange of the other joint member and the inner surface of the top wall of the cap nut. The conventional thrust rings for use in such pipe joints are in the form of an endless ring.

Since the conventional thrust ring is endless and annular, it is impossible to fit the ring to the joint member or to remove the ring therefrom by moving the ring in a direction perpendicular to the axis of the joint member. Further because the inside diameter of the thrust ring is of course smaller than the outside diameter of the flange of the joint member, the ring can not be attached to or removed from the joint member from the flanged end thereof. In other words, the thrust ring can be attached to and removed from the joint member only from one end thereof opposite to its flanged end. For this reason, two pipes are joined together by the pipe joint, for example, by fitting the thrust ring and the threaded member (hollow bolt or cap nut) to each joint member from one end thereof opposite to the flanged end before the pipes are connected to the respective joint members, then fitting the end of each pipe to be joined to the end of the joint member opposite to the flanged end, welding each of the fitted joints thus formed, and fastening the two threaded members to each other with a gasket interposed between the ends of the joint members to connect the joint members together.

The thrust ring for use in pipe joints is likely to corrode or become damaged or broken during use by being exposed to a corrosive liquid or gas, so that there arises a need for replacement. Further it is likely that a pipe will be connected to the pipe joint inadvertently without incorporating the thrust ring into the joint. The thrust ring must then be installed after connection.

Nevertheless, the conventional thrust ring can not be removed from or attached to the joint member except from the end thereof opposite to the flanged end as described above, so that the thrust ring can not be replaced or attached after the joint member has been welded to the pipe even if the two threaded members are separated to disassemble the pipe joint. Accordingly, when the thrust ring only is to be replaced, the ring is replaced, for example, by separating the two threaded members to disassemble the pipe joint, cutting the pipe having the old thrust ring at a suitable portion, removing the threaded member and the old thrust ring from the cut end, attaching a new thrust ring and the threaded member to the joint member, welding the cut portion of the pipe and thereafter fastening the two threaded members to each other to connect the joint members together. However, the procedure for replacing the thrust ring is very cumbersome and takes time. This is also true of the thrust ring which needs to be installed after connection. It is also likely that the piping including the pipe joint and the pipes on opposite sides thereof will be wholly replaced by a new piping system when there arises a need to replace or install the thrust ring after connection, whereas this is uneconomical.

SUMMARY OF THE INVENTION

The main object of the present invention is to provide a thrust ring for use in pipe joints which is easy to install and remove even after pipes have been connected to the pipe joint.

The present invention provides a pipe joint thrust ring to be interposed between a joint member of a pipe joint and a connecting threaded member rotatably fitted to the joint member, the thrust ring comprising a C-shaped body in the form of a circle partly cut away and having spring elasticity, the inner width between opposed ends of the C-shaped body being smaller than the outside diameter of the joint member and increasable to a value equal to the outside diameter of the joint member.

Preferably, the thrust ring has one or a plurality of cutouts formed in the inner periphery of the C-shaped body.

When attached to a joint member, the thrust ring is pressed against the joint member in a direction perpendicular to the axis of the joint member with the opposed ends of the C-shaped body serving as guides. Since the C-shaped body has spring elasticity, the pressure applied increases the inner width between the opposed ends to a value equal to the outside diameter of the joint member, permitting the thrust ring to be pushed toward the joint member until the inner periphery of the C-shaped body comes into contact with the outer periphery of the joint member. At this time, the opposed ends resume the original state in which the inner width is smaller than the outside diameter of the joint member, whereby the thrust ring is retained on the joint member. When the thrust ring is to be removed, an intermediate portion of the C-shaped body opposed to the space between its opposite ends is held and pulled away from the joint member in a direction perpendicular to its axis. This increases the end-to-end width until it becomes equal to the outside diameter of the joint member, whereby the thrust ring can be removed from the joint member.

Thus, the thrust ring embodying the invention for use in pipe joints comprises a C-shaped body having spring elasticity and can therefore be mounted on the joint member and removed therefrom from a direction perpendicular to the axis thereof. Accordingly, the thrust ring is easy to install and remove even after a pipe has been connected to the pipe joint without the necessity of cutting the pipe. This obviates the need to replace the whole piping by a new system for the replacement or installation of the thrust ring and assures economy.

When the C-shaped body is formed with one or a plurality of cutouts in its inner periphery, the C-shaped body is more readily deformable than otherwise, so that the thrust ring can be mounted and removed with a smaller force by a facilitated procedure.

DESCRIPTION OF THE PREFERRED EMBODIMENT

An embodiment of the invention will be described below with reference to the accompanying drawings.

Figure 3:
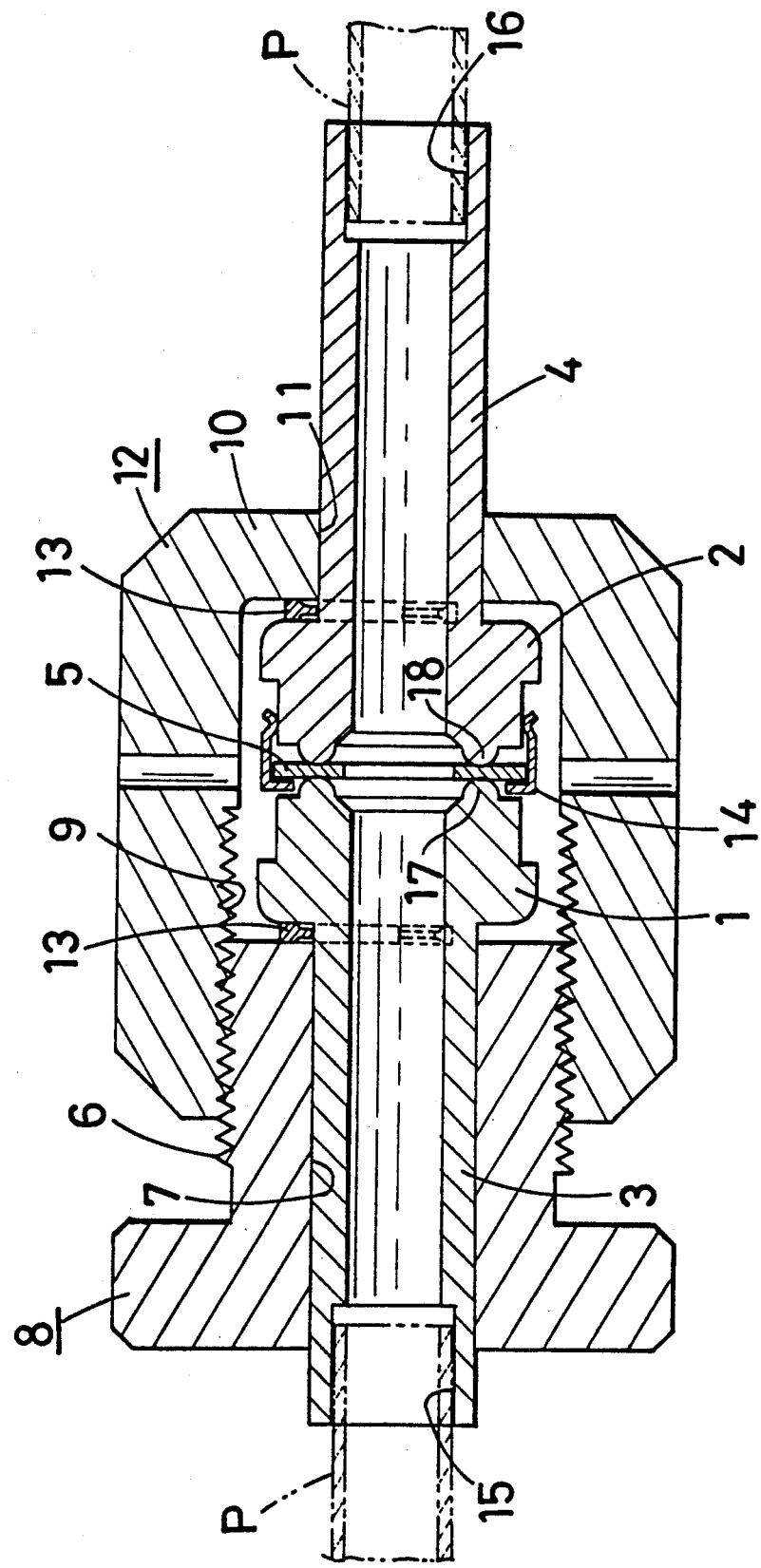
FIG. 3 is a view in longitudinal section showing an example of pipe joint having thrust rings of the invention incorporated therein.

FIG. 3 shows a pipe joint which comprises a pair of joint members 3, 4 having outer flanges 1, 2, respectively, each at one end, an annular gasket 5 interposed between the flanged ends of the joint members 3, 4, a hollow bolt 8 having an externally threaded portion 6 and a bore 7 extending axially therethrough for inserting one of the joint members, 3, through the bolt, and a cap nut 12 having an internally threaded portion 9 screwed on the externally threaded portion 6 of the hollow bolt 8 and formed with a hole 11 in the center of its top wall 10 for inserting the other joint member 4 therethrough. The pipe joint has a thrust ring 13 interposed between the flange 1 of the joint member 3 and the inner end of the hollow bolt 8, as well as between the flange 2 of the other joint member 4 and the inner surface of the top wall 10 of the cap nut 12. The gasket 5 is held to the flanged end of the joint member 4 by a known annular gasket retainer 14. The other end portions of the joint members 3, 4 have inside thereof pipe sockets 15, 16, respectively, each extending from an open extremity thereof over a predetermined length and having a larger diameter than the other portion of a channel extending through the joint member. The ends of two pipes P to be connected together are fitted in and welded to the respective sockets 15, 16. Annular ridges 17, 18, semicircular in cross section, are formed on the flanged end faces of the joint members 3, 4, respectively, with opposite surfaces of the gasket 5 in contact with the top ends of the ridges 17, 18.

Figure 1:
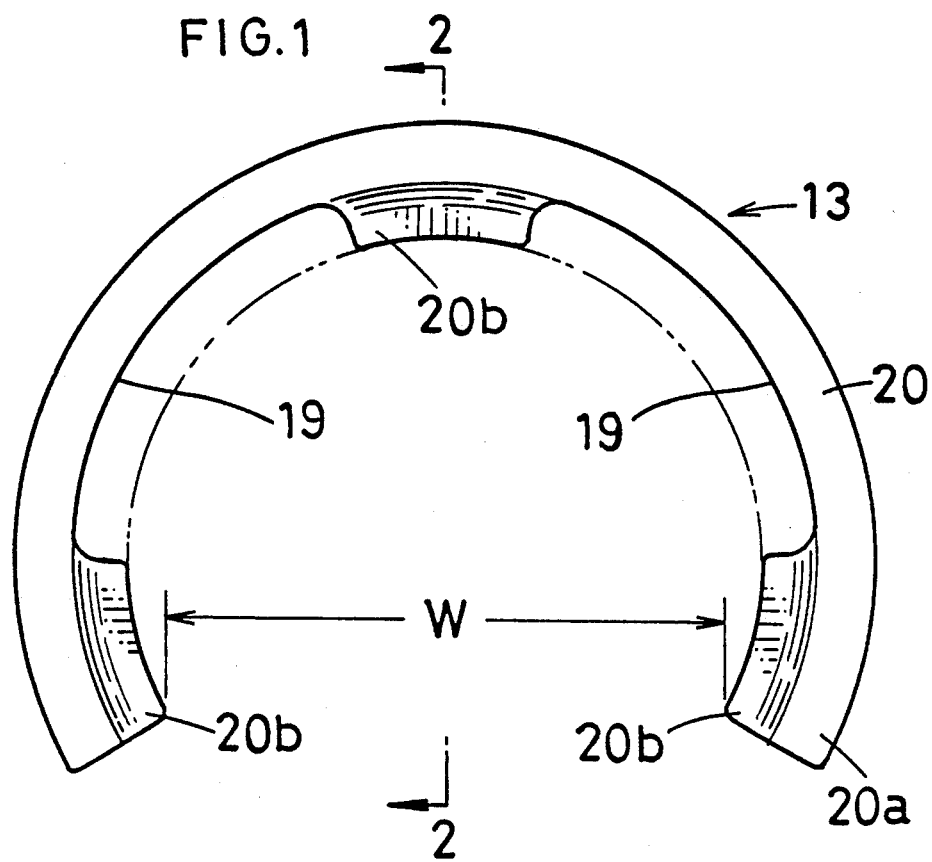
FIG. 1 is a front view showing a pipe joint thrust ring embodying the invention.
Figure 2:
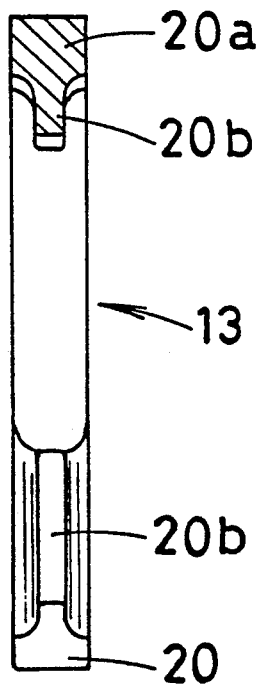
FIG. 2 is a view in section taken along the line II—II in FIG. 1.

With reference to FIG. 1, the thrust ring 13 comprises a C-shaped body 20 having a rectangular cross section and corresponding to a circle about ⅓ of the circumference of which is cut away. The C-shaped body 20 has two cutouts 19 formed in its inner periphery, is slightly smaller than the flanges 1, 2 of the joint members 3, 4 in outside diameter, and has an inside diameter approximately equal to the outside diameter of the joint members 3, 4. The opposed cut end faces of the C-shaped body 20 are generally perpendicular to the circumferential direction of the body 20 and are so opened as to form an inverted V-form when the body 20 is positioned with the cut ends down as seen in FIG. 1. The inner width (distance) W between the opposed ends of the C-shaped body 20 is smaller than the outside diameter of the joint members 3, 4 and can be increased to a value equal to the outside diameter of the joint members 3, 4. Further as shown in FIG. 2, the inner peripheral portion 20b of the C-shaped body 20 where the cutouts 19 are formed is smaller than the outer peripheral portion 20a thereof in thickness. Opposite sides of the portion interconnecting the inner peripheral portion 20b and the outer peripheral portion 20a are arcuate in cross section. The thrust ring 13 is made of stainless steel and coated with polytetrafluoroethylene (brand name: Teflon) to ensure reduced frictional resistance. Examples of other suitable materials for the thrust ring 13 are nickel, copper, aluminum alloy, synthetic resins, etc. Instead of polytetrafluoroethylene coating, the ring may alternatively be surface-treated as by silver plating or surface-hardening.

Pipes will be connected together by the pipe joint in the following manner.

First, the thrust ring 13 and the hollow bolt 8 are fitted to the joint member 3, and another thrust ring 13 and the cap nut 12 are fitted around the other joint member 4. The thrust ring 13 can be fitted to the joint member 3 or 4 by pressing the ring 13 against the joint member from a direction perpendicular to the axis of the joint member, or by placing the ring 13 onto the joint member 3 or 4 axially thereof from one end thereof opposite to the flange 1 or 2 since the pipe is not joined to the member. Next, the ends of the pipes P to be connected together are fitted into the sockets 15, 16 of the respective joint members 3, 4 and welded thereto. The gasket retainer 14 and the gasket 5 held thereto are then attached to one of the joint members 3, 4. The retainer 14 need not always be used for holding the gasket 5. When the retainer 14 is not used, the gasket 5 is held between the opposed end faces of the joint members 3, 4. With the gasket 5 thus retained in position, the hollow bolt 8 and the cap nut 12 are fastened to each other. At this time, the inner end face of the hollow bolt 8 and the inner surface of the top wall 10 of the cap nut 12 each slide in contact with the side face of C-shaped body 20 of the thrust ring 13 which face is reduced in frictional resistance, consequently precluding the joint members 3, 4 from rotating with the hollow bolt 8 or the cap nut 12.

To replace the thrust rings 13, the hollow bolt 8 and the cap nut 12 are unfastened and removed from each other, whereupon the thrust rings 13 appear as pressed against the flanges 1, 2 of the respective joint members 3, 4. Since the thrust rings 13 are elastic, each of these rings 13 is removable by pulling an intermediate portion of the C-shaped body 20 opposite to the space between the ends thereof outward in a direction perpendicular to the axis of the joint member and thereby increasing the inner width W between the ends of the C-shaped body 20 to a dimension equal to the outside diameter of the joint member. To install new thrust rings 13, each of the new rings 13 is pressed against the joint member 3 or 4 from a direction perpendicular to the axis thereof, with the ends of the C-shaped body 20, which are open to an inverted V-shape, serving as guides. The pressure applied expands the C-shaped body 20 until the inner width W between its opposed ends becomes equal to the outside diameter of the joint member, forcing the thrust ring 13 toward the joint member 3 or 4 until the inner periphery of the C-shaped body 20 comes into contact with the outer periphery of the joint member. At this time, the opposed ends of the C-shaped body resume the original state in which the inner width W therebetween is slightly smaller than the outside diameter of the joint member 3 or 4, whereby the thrust ring 13 is retained on the joint member.

The cutouts 19 are not limited to those of the foregoing embodiment with respect to the number and configuration thereof. Alternatively, these cutouts 19 can be omitted.

What is claimed is:

1. A pipe joint thrust ring interposed between a joint member of a pipe joint and a connecting threaded member rotatably fitted to the joint member, the thrust ring comprising a C-shaped body having a substantially rectangular cross-section and being in the form of a circle having approximately one-third of the circle cut away and having spring elasticity, the inner width between opposed ends of the C-shaped body being smaller than the outside diameter of the joint member and increasable to a value equal to the outside diameter of the joint member, wherein adjacent and in contact with said thrust ring, said joint member has a flange of greater outside diameter than an outside diameter of said thrust ring.

2. A pipe joint thrust ring as defined in claim 1 wherein the C-shaped body has at least one cutout formed in its inner periphery.

3. A pipe joint thrust ring as defined in claim 2, wherein said C-shaped body comprises stainless steel coated with polytetrafluoroethylene.

4. A pipe joint thrust ring as defined in claim 2, wherein said at least one cutout formed in the inner periphery of the C-shaped body is two cutouts equally spaced from the approximately one-third cut away portion of the circle.

5. A pipe joint thrust ring as defined in claim 1, wherein the opposed cut end faces of the C-shaped body defining the cut away portion of the thrust ring are perpendicular to a circumferential direction of the thrust ring.

6. The pipe joint thrust ring interposed between a joint member of a pipe joint and a connecting threaded member of claim 1, wherein the threaded member is a hollow bolt having an externally threaded portion and a bore extending axially therethrough in which said joint member is disposed, said thrust ring interposed between the flange of the joint member and an inner end of said hollow bolt.

7. A pipe joint thrust ring interposed between a joint member of a pipe joint and a connecting threaded member of claim 1, wherein said threaded member is a cap nut having an internally threaded portion and formed with a hole in a center of a top wall thereof through which said joint member is disposed, said thrust ring interposed between said flange of the joint member and an inner surface of the top wall of said cap nut.

* * * * *